United States Patent [19]
Onishi

[11] Patent Number: 5,309,845
[45] Date of Patent: May 10, 1994

[54] VEHICLE BODY

[75] Inventor: Hiroyuki Onishi, Kobe, Japan

[73] Assignee: Kawasaki Jukogyo Kabushiki Kaisha, Kobe, Japan

[21] Appl. No.: 48,588

[22] Filed: Apr. 19, 1993

Related U.S. Application Data

[63] Continuation of Ser. No. 830,899, Feb. 4, 1992, abandoned.

[30] Foreign Application Priority Data

Feb. 5, 1991 [JP] Japan ................... 3-014587

[51] Int. Cl.⁵ .................................... B61D 17/00
[52] U.S. Cl. .................... 105/422; 105/418; 105/419
[58] Field of Search ............... 105/345, 346, 347, 373, 105/397, 396, 422, 413, 414, 415, 418, 419; 52/729, 730; 410/130, 150

[56] References Cited

U.S. PATENT DOCUMENTS

| | | | |
|---|---|---|---|
| 2,457,250 | 12/1948 | Macomber | 52/729 |
| 3,083,794 | 4/1963 | Stovall | 52/729 |
| 3,099,335 | 7/1963 | Sklar | 52/729 |

FOREIGN PATENT DOCUMENTS

| | | | |
|---|---|---|---|
| 3309736 | 9/1984 | Fed. Rep. of Germany . | |
| 0568466 | 10/1957 | Italy | 105/422 |
| 62189251 | 8/1987 | Japan . | |
| 2036150 | 6/1980 | United Kingdom | 52/729 |

*Primary Examiner*—Mark T. Le
*Attorney, Agent, or Firm*—Leydig, Voit & Mayer

[57] ABSTRACT

A substructure of the body of a vehicle such as a railroad car is formed by linking first and second beams with each other. The first beams are formed of first and second members each having locking grooves, and the second beams are arranged at intervals perpendicular to the first beams, thus realizing, for example a thin-walled substructure. By virtue of the locking grooves formed thereon, the first members allow the attachment of seats or the like, and the second members allow the suspension of underfloor equipment.

21 Claims, 7 Drawing Sheets

VEHICLE BODY

This application is a continuation of application Ser. No. 07/830,899, filed Feb. 4, 1992 now abandoned.

BACKGROUND OF THE INVENTION

The present invention relates to the body of a vehicle such as a railroad car and, more specifically, to the structure of a vehicle body.

Figure 7:
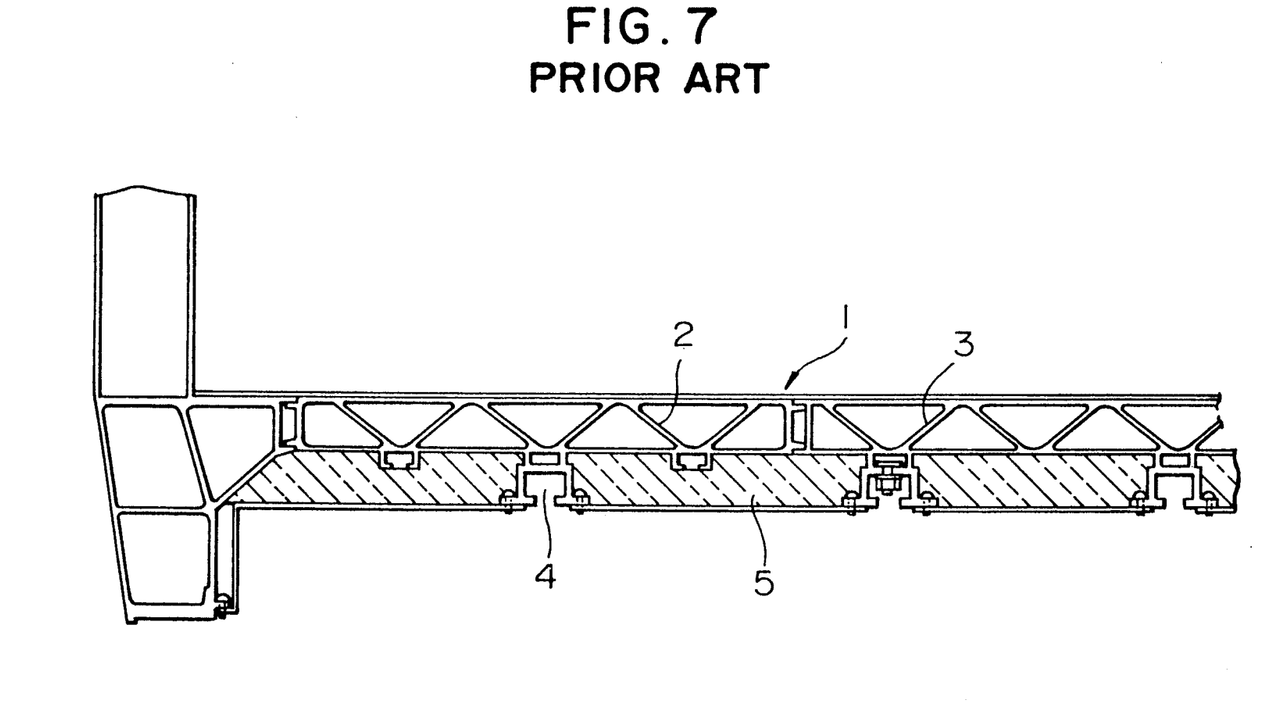
FIG. 7 is a simplified sectional view of a prior-art vehicle body.

FIG. 7 shows a typical structure of a prior-art technique, which is disclosed in Japanese Patent Laid-Open No. 62-189251. As shown in the drawing, a floor 1, which is formed, for example, of aluminum or the like, includes extruded sections 2 and 3 formed by extrusion in the longitudinal direction, i.e., in the direction perpendicular to the plane of FIG. 7. The extruded sections 2 and 3 are welded together to extend in the width direction and have grooves 4, to which underfloor equipment is fastened by means of bolts or the like. Reference numeral 5 indicates a heat insulating material.

A problem with this prior-art structure, in which the floor 1 is formed of the extruded sections 2 and 3, is that its thickness cannot be reduced to a level below a manufacturing limitation. To allow welding operations to be performed, a certain thickness has to be secured, thereby making it difficult to attain a further reduction in weight.

SUMMARY OF THE INVENTION

It is an object of the present invention to provide a vehicle body structure which allows further reduction in weight and whose components are arranged in a rational manner so as to impart requisite functions and performance to it.

In accordance with the present invention, there is provided a vehicle body comprising first and second beams which are connected together, the first beams consisting of first and second members each having locking grooves and connected together through the intermediation of webs, the second beams being arranged at intervals in a direction perpendicular to the first beams.

The locking grooves of the first members may be provided at such positions as will allow access from the inside of the vehicle so that components to be provided within the vehicle can be fastened thereto.

The first beams are typically in the longitudinal direction of the vehicle.

Further, the locking grooves of the second members may be provided at such positions as will allow access from the outside of the vehicle so that components to be provided on the outer side of the vehicle may be fastened thereto.

Both the first and second beams may be arranged in the longitudinal direction of the vehicle.

Thus, in accordance with the present invention, the first and second members, extending in the longitudinal direction of the vehicle body or a direction perpendicular thereto, are linked together to form the first beams, which are linked with the second beams that are perpendicular thereto. This structure may be used as the substructure of a railroad car. By providing thereon thin floor panels or the like, it can be formed as a floor structure. Compared with the above floor structure of extruded sections, described with reference to FIG. 7, the floor structure of the present invention allows a further reduction in weight and can be formed using less material.

By virtue of the locking grooves formed on the first and second members, any requisite components to be provided inside or on the outer side of the vehicle can be secured by utilizing the first or the second members, and such components can be detached easily. Examples of the components to be provided inside the vehicle include seats, room partitions, distribution panel, lavatory equipment or the like, telephone equipment, conductor's room, and food service equipment; and examples of the components to be provided on the outer side of the vehicle include underfloor equipment, pipes, electric cables, and ducts containing these items.

DESCRIPTION OF THE PREFERRED EMBODIMENT

Figure 1:
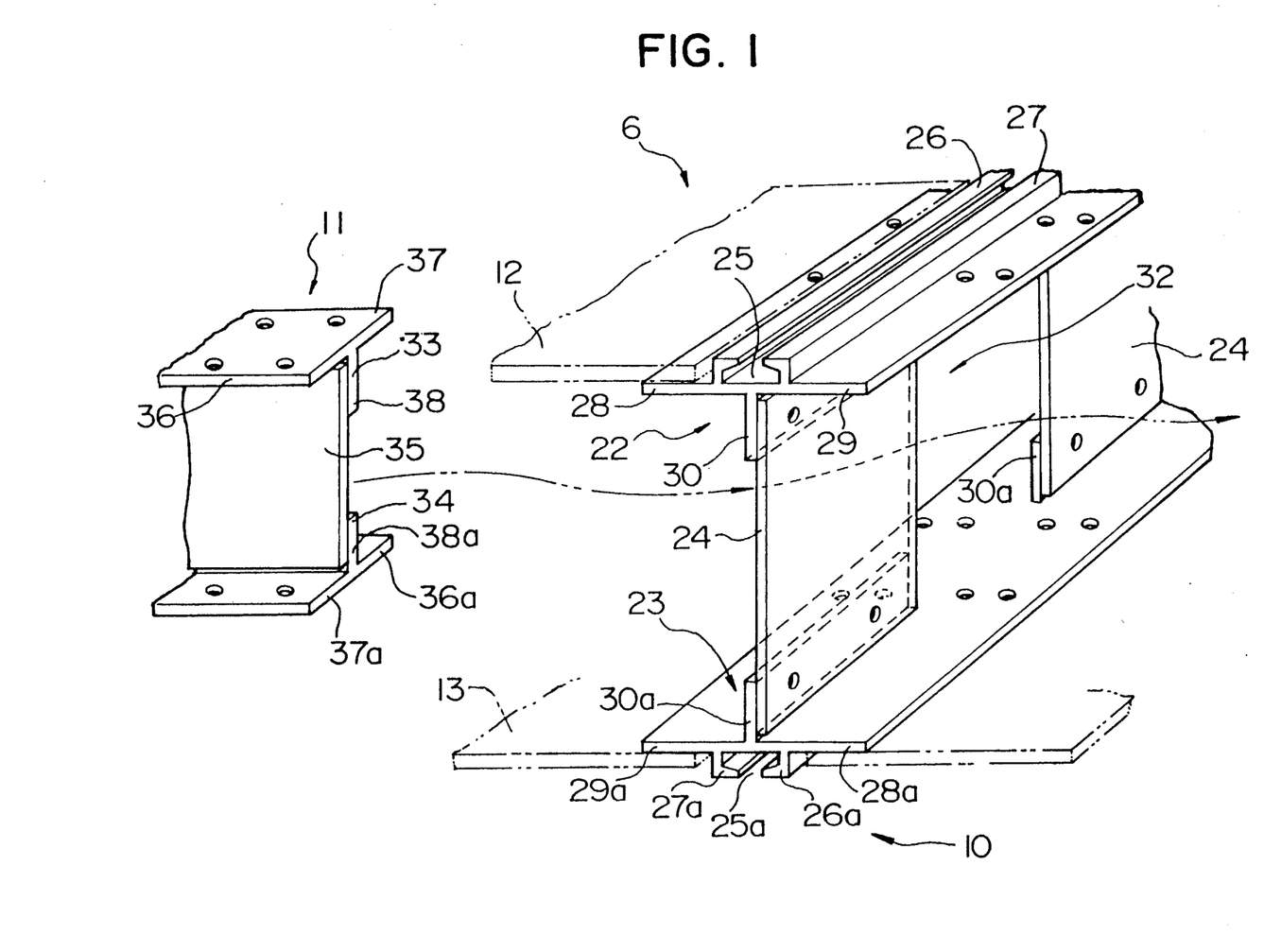
FIG. 1 is an exploded perspective view of an essential part of a vehicle body in accordance with a preferred embodiment of the present invention.
Figure 2:
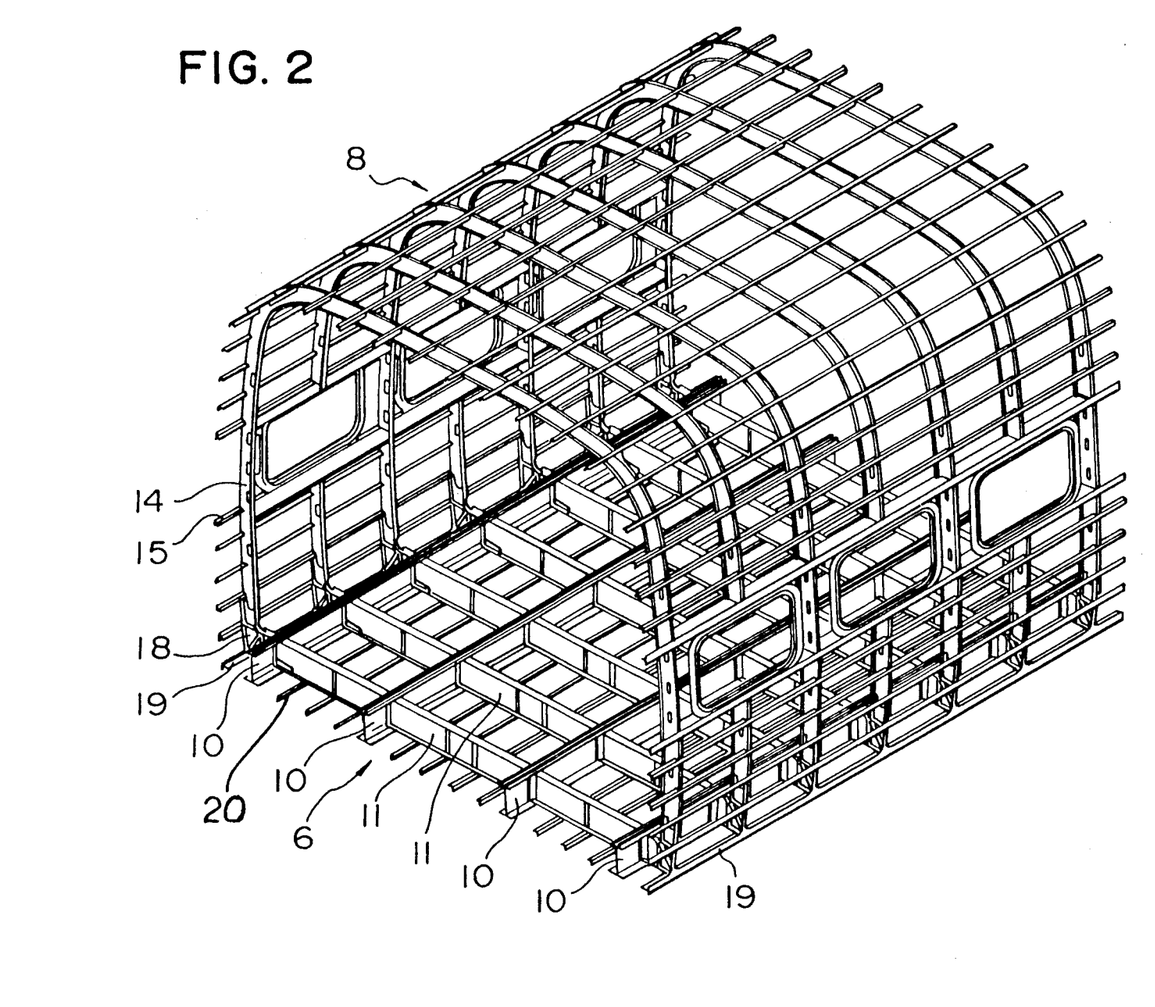
FIG. 2 is a reduced perspective view of a part of a vehicle body with its covering removed.

FIG. 1 is a perspective view of a substructure 6 of a railroad car, and FIG. 2 is a perspective view of a part of a vehicle body 8 equipped with the substructure 6 of FIG. 1. In the substructure 6, one or more first beams 10 extend longitudinally to the vehicle body, and these first beams 10 are connected with second beams arranged at fixed intervals and perpendicular thereto, thus forming the substructure 6. As shown in FIG. 1, the substructure 6 includes floor plates 12 and thin bottom plates 13 which are respectively fixed in position in the upper and lower sections of the substructure. In FIG. 2, the floor plates 12 and the bottom plates 13 are omitted.

Rounded frames 14 are arranged at intervals along the longitudinal direction of the vehicle body to form a body having a reverse-U-shaped sectional configuration. Arranged along these frames 14 are longitudinal members 15 extending in the longitudinal direction of the vehicle body. The end portions of the frames 14 and those of the second beams 11 are linked together by means of joint members 18. Strong longitudinal members 19 are attached to the end portions of the frames 14 in the vicinity of the joint members 18. Fixed to the lower and outer sides of the second beams 11 are longitudinal members 20 for reinforcing the bottom plates 13; the longitudinal members 20 are arranged at intervals in the width direction and extend in the longitudinal direction of the vehicle. A covering (not shown) is attached to the outer periphery of the longitudinal members 15 and the strong longitudinal members 19.

Each of the first beams 10 consists of first and second members 22 and 23 and a web 24 connecting them together. The first member 22 includes a pair of opposite locking sections such as lips facing each other 26 and 27 defining a locking groove 25, mounting sections 28 and 29 extending outwardly from the locking sections 26 and 27, and another mounting section 30 extending on the opposite side of the locking groove 25 (i.e., downwards as seen in FIG. 1). The locking groove 25 appears in cross-section to be formed from two substantially L-shaped sections projecting above the plane of the upper surfaces of the mounting sections 28 and 29, wherein the "base" of each L-shaped section faces the base of the opposing base. Thus, the first member 22 has a symmetrical, or nearly symmetrical, sectional configuration.

The second member 23 has a configuration which is the same or similar to that of the first member 22, and those portions thereof corresponding to those of the first member are indicated by the same reference numerals with an adscript "a". The locking grooves 25 and 25a extend in the longitudinal direction of the vehicle body. It is desirable that the first and second members 22 and 23 consist of sections of aluminum or the like formed by extrusion. The web 24 extends across the mounting sections 30 and 30a of the first and second members 22 and 23 and is fastened thereto by means of rivets or the like. The floor plates 12 are fastened to the mounting sections 28 and 29 of the first member 22 likewise by means of rivets or the like. The thin bottom plates 13 are fastened to the mounting sections 28a and 29a of the second member 23 by means of rivets or the like. Instead of rivets, the fastening may be effected by a combination of bolts and nuts or by welding.

The cross section perpendicular to the axis of the first beam 10 thus formed has a substantially I-shaped configuration. Accordingly, the beam has a large modulus of section, thus providing an increased strength.

By forming the first and second members 22 and 23 of completely or substantially the same size and configuration, it is possible to impart satisfactory sectional performance and balance to the first beam. Further, by changing the size and configuration of the first and second members 22 and 23 in accordance with any requirements in design, it is possible to realize proper design values.

Further, with this construction, no side beams as used in the bodies of conventional railroad cars or the like are required, and the force acting on the coupler can be advantageously transmitted in the longitudinal direction of the first beams 10.

Each of the second beams 11 has third and fourth members 33 and 34 and a web 35 connecting them together. As shown in FIG. 1, the third member 33 has mounting sections 36 and 37, and another mounting section 38 extending perpendicular to them. The third member 33 has a substantially T-shaped, axisymmetrical or nearly symmetrical cross-sectional configuration. The fourth member 34 has a configuration which is the same or similar to that of the third member 33, and those portions thereof corresponding to those of the third member are indicated by the same reference numerals with an adscript "a". A plurality of the second beams 11 are arranged at intervals along the longitudinal direction of the vehicle body.

Figure 3:
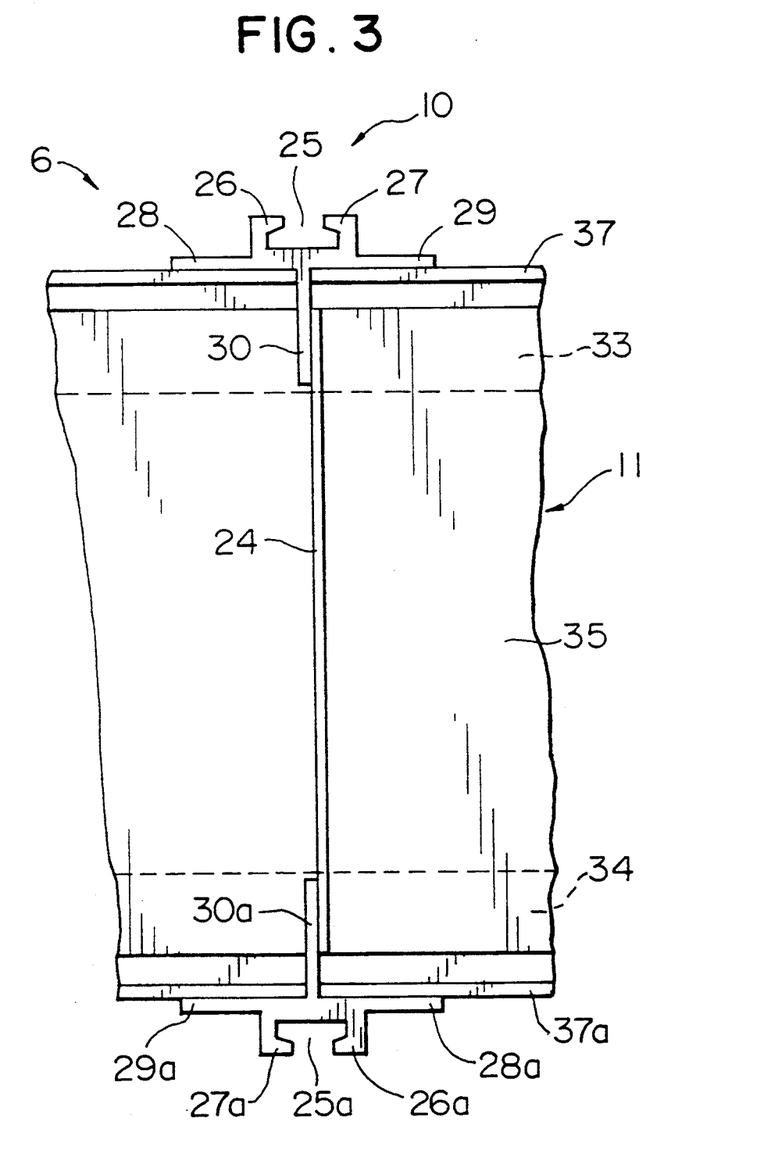
FIG. 3 is a sectional view of a vehicle portion around first and second beams shown in FIG. 1.

As shown in FIG. 1, the mounting sections 30 and 30a of the first and second members 22 and 23 exhibit partial cutouts arranged at intervals longitudinally to the vehicle body, and the web 24 is accordingly separated into sections, thereby forming openings 32 through which the second beams 11 are passed. By virtue of this structure, the second beams 22 are joined with the first beams 10, as shown in FIG. 3.

In certain constructions, the first and second beams 10 and 11 may be replaced by each other, in accordance with any design requirements, so that the second beams extend in the longitudinal direction of the vehicle body whereas the first beams extend across the body. In that case, the reinforcing longitudinal members 20 are arranged in parallel with the first beams 10.

The mounting sections 28 and 29 of the first members 22 and the mounting sections 28a and 29a of the second members 23, both members belonging to the first beams 10, are respectively fastened to the mounting sections (36 and 37) and (36a and 37a) of the second beams 11 by means of rivets, a combination of bolts and nuts, welding or the like. The webs 24 and 35 are linked together by means of joint members (not shown) and fixed in position.

Figure 4:
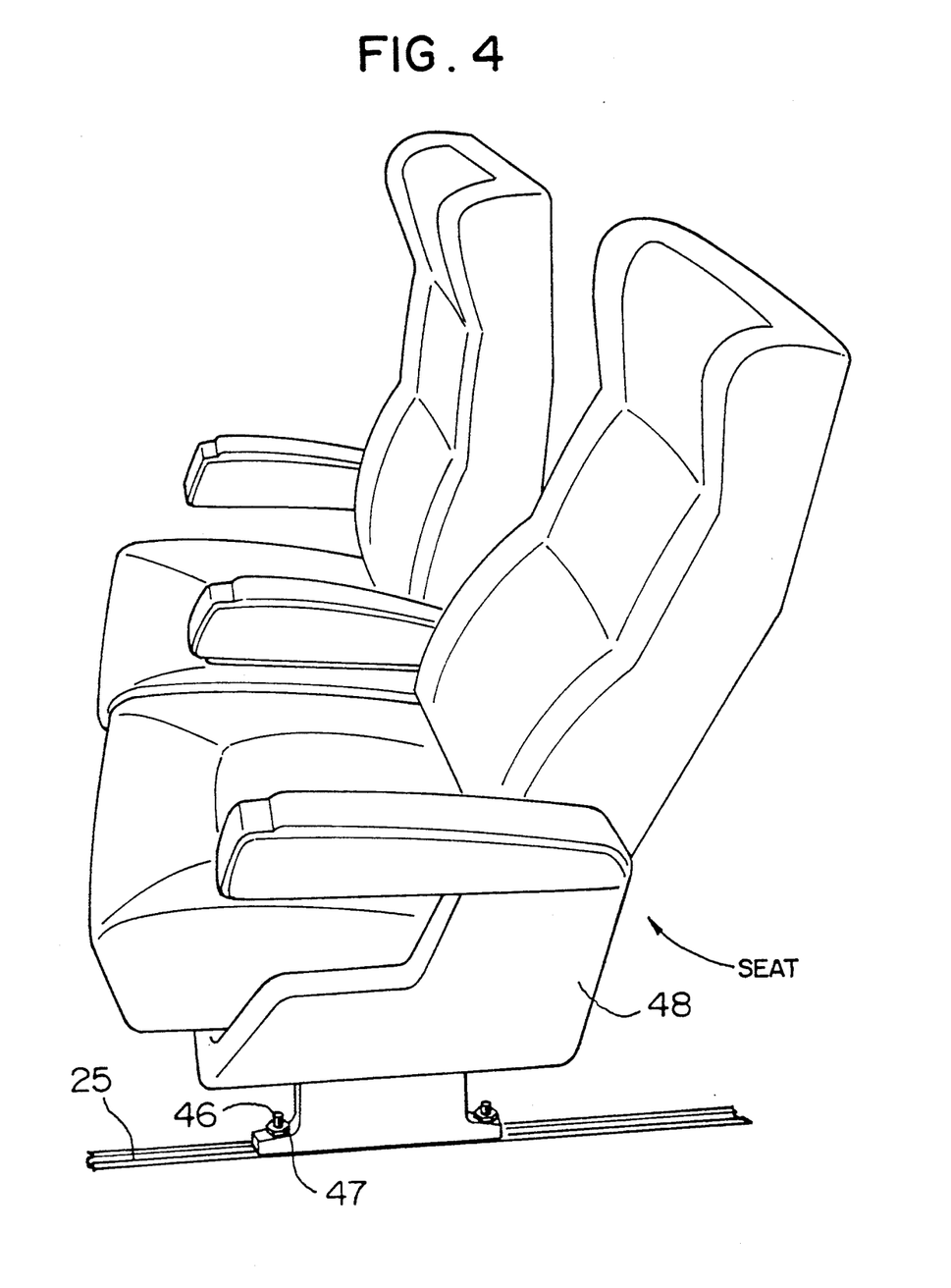
FIG. 4 is a perspective view of seats mounted inside a vehicle body in accordance with the present invention.
Figure 5:
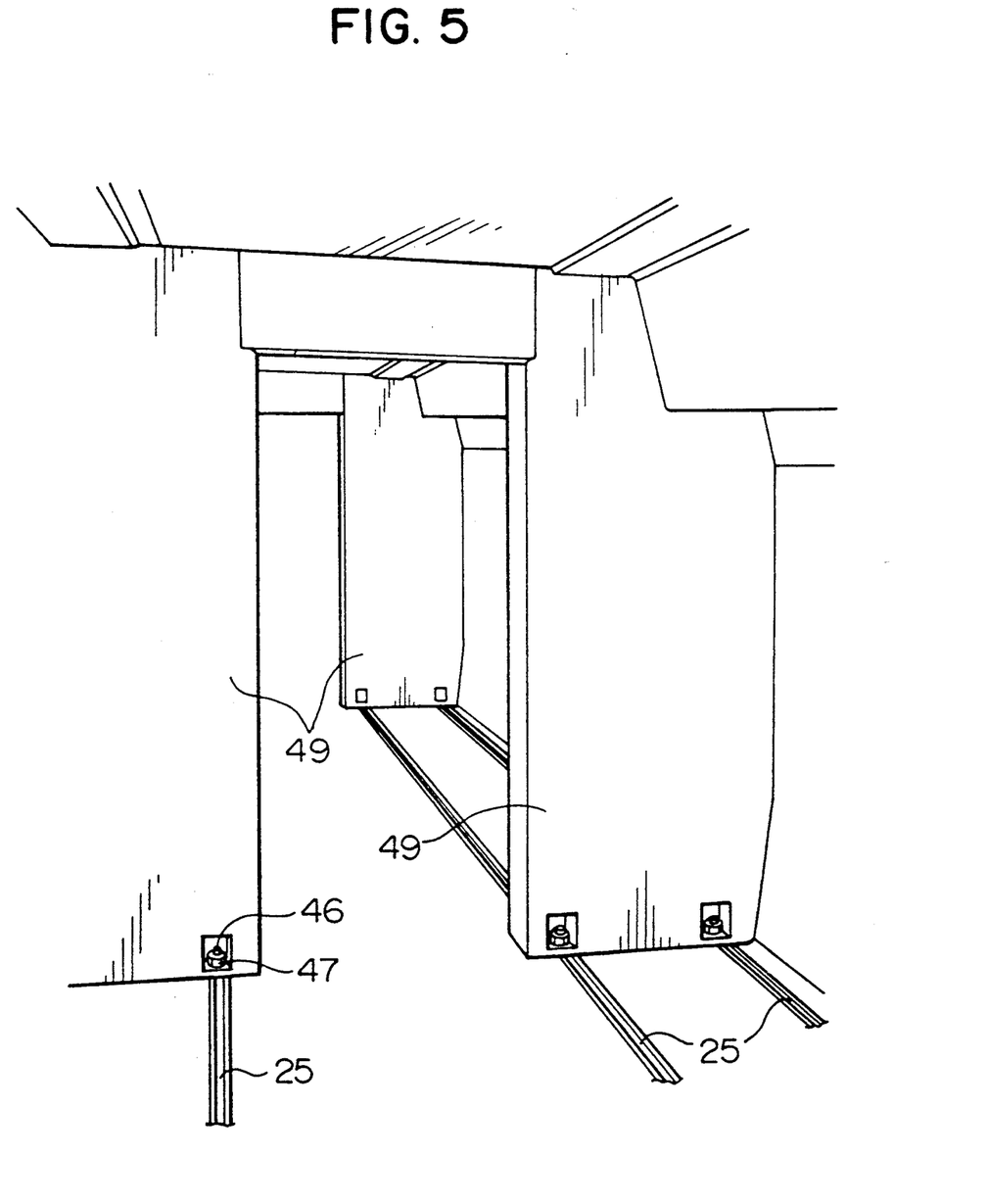
FIG. 5 is a perspective view of partitions provided inside a vehicle body in accordance the present invention.

As shown in FIG. 4, long and thin head sections of bolts 46 are fitted into the locking grooves 25 of the first members 22 of the first beams 10 and are locked therein. Components inside the vehicle are secured by fastening them with the shaft sections of the bolts 46 and nuts 47. Examples of the components inside the vehicle include seats 48 as shown in FIG. 4, partitions 49 for defining compartments as shown in FIG. 5, distribution panels, lavatory equipment or the like, telephone equipment, conductors room, and food service equipment.

Figure 6:
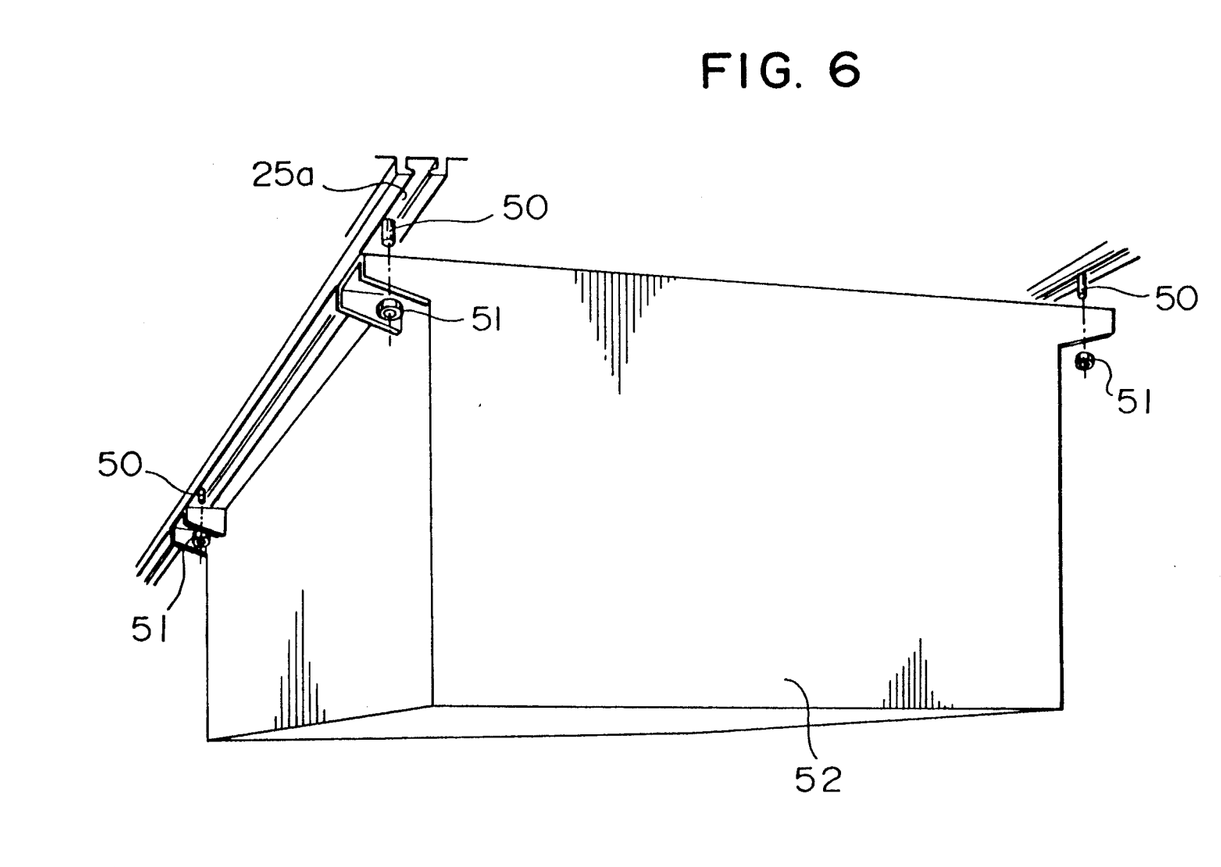
FIG. 6 is a perspective view of equipment attached to the outer side of a vehicle body in accordance the present invention.

As shown in FIG. 6, long and thin head sections of bolts 50 are fitted into the locking grooves 25a of the second members 23 and are locked therein. Components on the outer side of the vehicle are secured by means of the shaft sections of the bolts 50 and nuts 51. Examples of the components to be provided on the outer side of the vehicle include, apart from underfloor equipment 52 as shown in the drawing, pipes, electric cables, and ducts containing these items. By using the above bolts 46 and 50, any requisite components can be fixed to desired positions on the body structure by an easy mounting operation, allowing the mounting of various components depending upon the type of vehicle.

The present invention can be applied not only to railroad cars as in the above embodiment, but also to vehicles in general including ships and aircraft, thus providing a wide range of application.

Thus, in accordance with the present invention, the first and second members are linked together through the intermediation of webs to form the first beams, which are linked with the second beams arranged perpendicular thereto. Compared with the structure composed of extruded sections, described with reference to the prior art shown in FIG. 7, the structure of the present invention allows a further reduction in weight and can be formed using less material.

Further, in accordance with the present invention, the first and second members are equipped with locking grooves, which allow the attachment of requisite components inside or on the outer side of the vehicle. Furthermore, such components can be easily detached. Thus, the present invention can be realized in a variety of forms by mounting desired components depending upon the use of the vehicle.

What is claimed is:

1. A vehicle body comprising first and second beams connected together, said second beams extending perpendicular to said first beams and arranged at intervals longitudinally along said first beams, at least one of said first beams having first and second members each having a locking grove for receiving a head of a bolt, and a web connecting said first and second members with each other, said first and second members also including mounting sections, each having an outwardly facing surface which defines a plane, and a portion of each of said first and second members in which said locking groove is formed projecting outwardly from each of said outwardly facing surfaces.

2. A vehicle body according to claim 1, wherein said first beams are arranged longitudinally to the vehicle body, and wherein said locking grove of said first member of said at least one of said first beams is located at a position which allows access from the inside of the vehicle.

3. A vehicle body according to claim 1, wherein said first beams are arranged longitudinally to the vehicle body, and wherein said locking groove of said second member of said at least one of said first beams is located at a position which allows access from the outside of the vehicle.

4. A vehicle body according to claim 1, wherein said second beams are arranged longitudinally to the vehicle body, and wherein said locking groove of said first member of said at least one of said first beams is located at a position which allows access from the inside of the vehicle.

5. A vehicle body according to claim 1, wherein said second beams are arranged longitudinally to the vehicle body, and wherein said locking groove of said second member of said at least one of said first beams is located at a position which allows access from the outside of the vehicle.

6. A vehicle body according to claim 1 wherein said web has at least one opening through which one of said second beams passes.

7. A vehicle body according to claim 1 wherein each of said first and second members of said at least one of said first beams has a mounting section to which a section of said web is secured.

8. A vehicle body according to claim 1 wherein said locking groove is defined by a bottom wall and two side walls, each of said side walls having a lip facing an opposing lip, the locking groove having a C-shaped cross-section.

9. A vehicle body according to claim 1 wherein each of said first and second beams has a substantially I-shaped cross section.

10. A vehicle body according to claim 1 wherein each of said first and second beams includes mounting sections having outwardly facing surfaces which define planes, the planes of said second beams being recessed from those of said first beams.

11. A vehicle body comprising first and second beams connected together, said second beams extending perpendicular to said first beams and arranged at intervals longitudinally along said first beams, at least one of said first beams having first and second members each having a locking groove for receiving a wide portion of a fastener, and a web connecting said first and second members with each other, said first and second members also including mounting sections having outwardly facing surfaces each of which defines a plane, and a portion of each of said first and second members in which said locking groove is formed projecting outwardly from each of said outwardly facing surfaces.

12. A vehicle body according to claim 11 wherein said fastener comprises a nut and bolt and said wide portion comprises the head of the bolt.

13. A vehicle body according to claim 11 wherein said first beams are arranged longitudinally to the vehicle body, and wherein said locking groove of said first member of said at least one of said first beams is located at a position which allows access from the inside of the vehicle body.

14. A vehicle body according to claim 11 wherein said first beams are arranged longitudinally to the vehicle body, and wherein said locking groove of said second member of said at least one of said first beams is located at a position which allows access from the outside of the vehicle body.

15. A vehicle body according to claim 11 wherein said second beams are arranged longitudinally to the vehicle body, and wherein said locking groove of said first member of said at least one of said first beams is located at a position which allows access from the outside of the vehicle body.

16. A vehicle body according to claim 11 wherein said second beams are arranged longitudinally to the vehicle body, and wherein said locking groove of said second member of said at least one of said first beams is located at a position which allows access from the outside of the vehicle body.

17. A vehicle body according to claim 11 wherein said web has at least one opening through which one of said second beams passes.

18. A vehicle body according to claim 11 wherein each of said first and second members of said at least one of said first beams has a mounting section to which a section of said web is secured.

19. A vehicle body according to claim 11 wherein each of said locking grooves is defined by a bottom wall and two side walls, each of said side walls having a lip facing an opposing lip, the locking groove having a C-shaped cross-section.

20. A vehicle body according to claim 11 wherein each said first and second beams has a substantially I-shaped cross section.

21. A vehicle body according to claim 11 wherein each of said first and second beams includes mounting sections having outwardly facing surfaces which define planes, the lanes of said second beams being recessed from those of said first beams.

* * * * *